(12) United States Patent
Pellenc et al.

(10) Patent No.: US 8,146,337 B2
(45) Date of Patent: Apr. 3, 2012

(54) HARVESTING HEAD AND SELF-PROPELLED STRADDLING VEHICLE FOR HARVESTING FRUIT-BEARING HEDGES

(75) Inventors: Roger Pellenc, Pertuis (FR); Jean-Marc Gialis, Cheval Blanc (FR); Christian Rolland, Cucuron (FR)

(73) Assignee: Pellenc (Societe Anonyme), Pertuis (FR)

( * ) Notice: Subject to any disclaimer, the term of this patent is extended or adjusted under 35 U.S.C. 154(b) by 43 days.

(21) Appl. No.: 12/630,254

(22) Filed: Dec. 3, 2009

(65) Prior Publication Data

US 2010/0139235 A1    Jun. 10, 2010

(30) Foreign Application Priority Data

Dec. 10, 2008    (FR) ..................................... 08 06916

(51) Int. Cl.
*A01D 46/00* (2006.01)
(52) U.S. Cl. ...................................................... 56/328.1
(58) Field of Classification Search .................. 56/328.1, 56/330, 329
See application file for complete search history.

(56) References Cited

U.S. PATENT DOCUMENTS

| | | | | |
|---|---|---|---|---|
| 3,184,908 A * | 5/1965 | Rust | ................................. | 56/330 |
| 3,777,463 A * | 12/1973 | Claxton | .......................... | 56/330 |
| 4,445,316 A * | 5/1984 | Browning et al. | ............... | 56/330 |
| 4,750,322 A * | 6/1988 | Korthuis | ....................... | 56/328.1 |
| 5,181,373 A * | 1/1993 | Littau | .............................. | 56/329 |
| 5,259,177 A * | 11/1993 | Windemuller et al. | .......... | 56/330 |
| 5,339,612 A * | 8/1994 | Scott | ................................. | 56/330 |
| 5,495,708 A * | 3/1996 | Scott et al. | ....................... | 56/329 |
| 5,956,933 A * | 9/1999 | Heard | .............................. | 56/329 |
| 5,966,915 A * | 10/1999 | Crunkelton | ................... | 56/328.1 |
| 6,145,291 A * | 11/2000 | Jarmain | .......................... | 56/330 |
| 6,158,203 A * | 12/2000 | Scott | .............................. | 56/328.1 |
| 6,557,335 B2 * | 5/2003 | Amaro et al. | ................. | 56/328.1 |
| 6,901,731 B2 * | 6/2005 | Scott et al. | ....................... | 56/330 |
| 7,581,375 B2 * | 9/2009 | Meester | ........................ | 56/327.1 |
| 7,694,502 B2 * | 4/2010 | Meester | ........................ | 56/327.1 |
| 7,748,205 B2 * | 7/2010 | Amaro | .......................... | 56/328.1 |
| 7,788,888 B2 * | 9/2010 | Avalle et al. | ................. | 56/10.2 R |
| 2005/0034441 A1* | 2/2005 | Porta et al. | ..................... | 56/328.1 |
| 2007/0012018 A1* | 1/2007 | Pellenc et al. | ................ | 56/328.1 |
| 2008/0034726 A1* | 2/2008 | Bonadeo | ....................... | 56/328.1 |

* cited by examiner

*Primary Examiner* — Arpad Fabian-Kovacs
(74) *Attorney, Agent, or Firm* — Egbert Law Offices PLLC

(57) ABSTRACT

Harvesting head for picking fruit-bearing hedges, including a chassis in the form of a portal structure supporting, on the one hand, a shaking system including two fruit-detaching assemblies, mounted opposite each other and separated by a vertical space, and, on the other hand, two conveyor systems for receiving and transporting the harvested fruit to a receiving container, the lower horizontal portions of these two conveyor systems also providing tightness, below the shaking units. This harvesting head being supported by a mounting frame which is meant to be rigidly fastened, preferably in a removable manner, at the rear of a self-propelled straddling vehicle, including a height-adjustable chassis. The position of said harvesting head is height-adjustable in relation to said mounting frame, so that when said harvesting head is fastened to the chassis of the self-propelled straddling vehicle, it is mounted in a height-adjustable fashion in relation to said self-propelled straddling vehicle.

7 Claims, 4 Drawing Sheets

HARVESTING HEAD AND SELF-PROPELLED STRADDLING VEHICLE FOR HARVESTING FRUIT-BEARING HEDGES

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns a harvesting head for small fruit produced on hedges, in particular in orchards. It also concerns the self-propelled straddling vehicles used for its application, i.e., the assemblies constituted by a self-propelled straddling vehicle carrying a harvesting head mounted to the rear of the chassis of this vehicle.

2. Description of Related Art Including Information Disclosed Under 37 CFR 1.97 and 37 CFR 1.98

Nowadays, for harvesting olives grown in fruit hedges, certain olive-growers use machines of large dimensions similar to grape-harvesting machines, particularly in regions where vines are cultivated on relatively high trellises (in the order of 2 m).

These machines feature a harvesting head comprising generally a shaking system including two fruit-detaching assemblies that are mounted opposite each other and separated by a vertical space, these assemblies featuring each a number of stacked shakers, for example consisting of flexible bars attached, through the intermediary of their ends, to two vertical shafts, of which at least one is an oscillating actuation shaft linked to a shaking control so as to impart it an oscillating movement. Such a harvesting head also includes two lateral conveyor systems to receive and transport the picked fruit to a receiving device (bin or other), the horizontal portions of these transporting systems ensuring also tightness around the low part of trunks (vine-stock), below the shaking assemblies.

The harvesting head is solidly mounted on the rear part of the chassis of a self-propelled straddling vehicle which can be equipped with means to raise or to lower it between a low position for road-transport and a high working position. In this case the harvesting head is fixed to said chassis and goes along with its raising and lowering movements.

One drawback of these machines, whatever their intended use, is their large dimensions (in the order of 3.0 m wide and 4.0 m) high, which poses problems for their transport on a flatbed truck or their movements over the road, to go from one plantation to another.

However, the main constraint imposed by the machines presently in use consists of the clearance under the arch of the straddling vehicle, the height of which may vary between 2.20 m and 2.80 m and the capabilities of a threshing head to shake a fruit-bearing hedge instead of a trellised vine, the active part of this threshing head being about 1.80 m high.

The fact that one has available a threshing height of 1.80 m and an arch clearance of a height of 2.20 m, obliges the driver of the harvesting machine to adjust the straddling vehicle in the high position (2.80 m) to allow the fruit-bearing trees (olive-trees for example) to pass without breaking them, but the problem that arises then is that the lower tightness system of the harvesting head which is integral with the movements of rising and lowering of said straddling vehicle is fully immersed in the vegetation, on the branch level, instead of tightening around a tree trunk, this causing significant losses of fruit dropping to the ground, heavy breaking of branches and leaving in place, at the same time, on the low part of the trees, all the fruit that did not come in contact with the picking arms of the harvesting head.

In the opposite case, if the driver operates the straddling vehicle in its lowest position, so as not to leave behind any fruit and to prevent any fruit from falling to the ground, the olive-trees (in the case of an olive-grove) which have a height above 2.20 m are going to be forced to pass under the arch of said straddling vehicle at the risk of breaking them at ground level.

On the other hand, if in spite of everything, the olive-trees manage to twist without breaking to pass under the arch of the straddling vehicle (2.20 m) the harvesting head (1.80 m) is going to leave all the fruit that is on the upper portion of the trees when the fruit passes into the harvesting head and to ruin a great part of it with the threshing mechanism.

There are also hybrid machines designed for the harvesting of grapes and olives which are in fact customized grape gathering machines with an arch in the order of 2.40 m to 3.0 m and a threshing height of 2.0 m to 2.8 m. For the time being these are the only ones operating effectively in olive orchards.

A major drawback of these machines is that they are extremely large to mitigate the constraints of the standard grape-harvesting machines mentioned above.

So, this type of machine is higher, larger, longer, heavier, and more expensive. Its versatility becomes questionable as soon as one wants to pick grapes; because of its oversized dimensions, this type of machine is no longer really suitable for vineyards, because it is practically impossible to turn the machine around at the end of a row during the vine-harvest.

BRIEF SUMMARY OF THE INVENTION

The purpose of the present invention is to make available to professionals in the business of automatic harvesting of small fruit grown in orchards (olives, plumbs, cherries or coffee beans, etc.) a harvesting head especially designed for the picking of olive hedges (or other fruit trees that are cultivated in hedges) and intended to be mounted on a standard multi-purpose straddling vehicle that is also usable in viticulture, so as to form a self-propelled straddling assembly capable of solving the previously mentioned problems and to remedy the ensuing drawbacks.

According to the invention, this goal has been achieved owing to a harvesting head comprising a chassis in the shape of a straddling carrier supporting, on the one hand, a shaking system consisting of two fruit-detaching assemblies, mounted opposite to each other and separated by a vertical space, and, on the other hand, of two conveyor systems to receive and transport the picked fruit to a receiving device, the lower horizontal portions of these two transporting systems ensuring also tightness, below the shaking systems. This harvesting head being held up by a mounting frame intended to be solidly fastened, preferably in a detachable manner, to the rear of a self-propelled straddling vehicle including a height-adjustable chassis, This harvesting head being noteworthy in that its position is height-adjustable relative to said mounting frame, so that, when said harvesting head is fastened on the chassis of the straddling vehicle, it finds itself likewise mounted in height-adjustable fashion relative to said straddling self-propelled vehicle.

According to another characteristic arrangement, the mounting frame is connected to the bearing chassis of the harvesting head by means of lateral expanding parallelograms.

According to an interesting method of execution, each lateral expanding parallelogram comprises: one of the sides of the mounting frame, an upper and a lower connecting rod which are linked, through the intermediary of one of their ends and by means of hinges, to the upper and the lower part of said side, respectively. On the other hand, the opposite ends of said connecting rods are linked, by hinges, respectively, to side elements of the chassis of the harvesting head. Means of actuation allowing the displacement of the expanding parallelograms ensuring the vertical movements of the harvesting head relative to its mounting frame, i.e., relative to the self-propelled straddling vehicle when the latter [i.e. the harvesting head] is installed at the rear of said self-propelled straddling vehicle.

According to a preferred method of realization, the actuating means are constituted by a jack linking, through the intermediary of its opposite ends and hinges, the upper connecting rod and the low part of the corresponding side of the mounting frame.

The self-propelled straddling machine according to the invention comprises a straddling vehicle featuring a chassis supported by height-adjustable suspension devices and a harvesting head produced in the aforementioned manner, attached on the rear part of said chassis through the intermediary of its mounting frame.

According to another characteristic arrangement, the suspension system of the self-propelled straddling vehicle and at least one of the hinge bolts of at least one of the connecting rods of at least one of the expanding parallelograms, are equipped with angle transmitters to control the position of the harvesting head in relation to said self-propelled straddling vehicle so as to keep said harvesting head, and in particular its lower portion, at a programmed distance relative to the ground.

According to the invention, this distance remains the same, whether the self-propelled straddling vehicle be either in low or road position, or whether it be in high or working position.

BRIEF DESCRIPTION OF THE SEVERAL VIEWS OF THE DRAWINGS

The above-mentioned goals, characteristics and advantages, and still others, will become clearer from the following description and the attached drawings in which.

Figure 1:
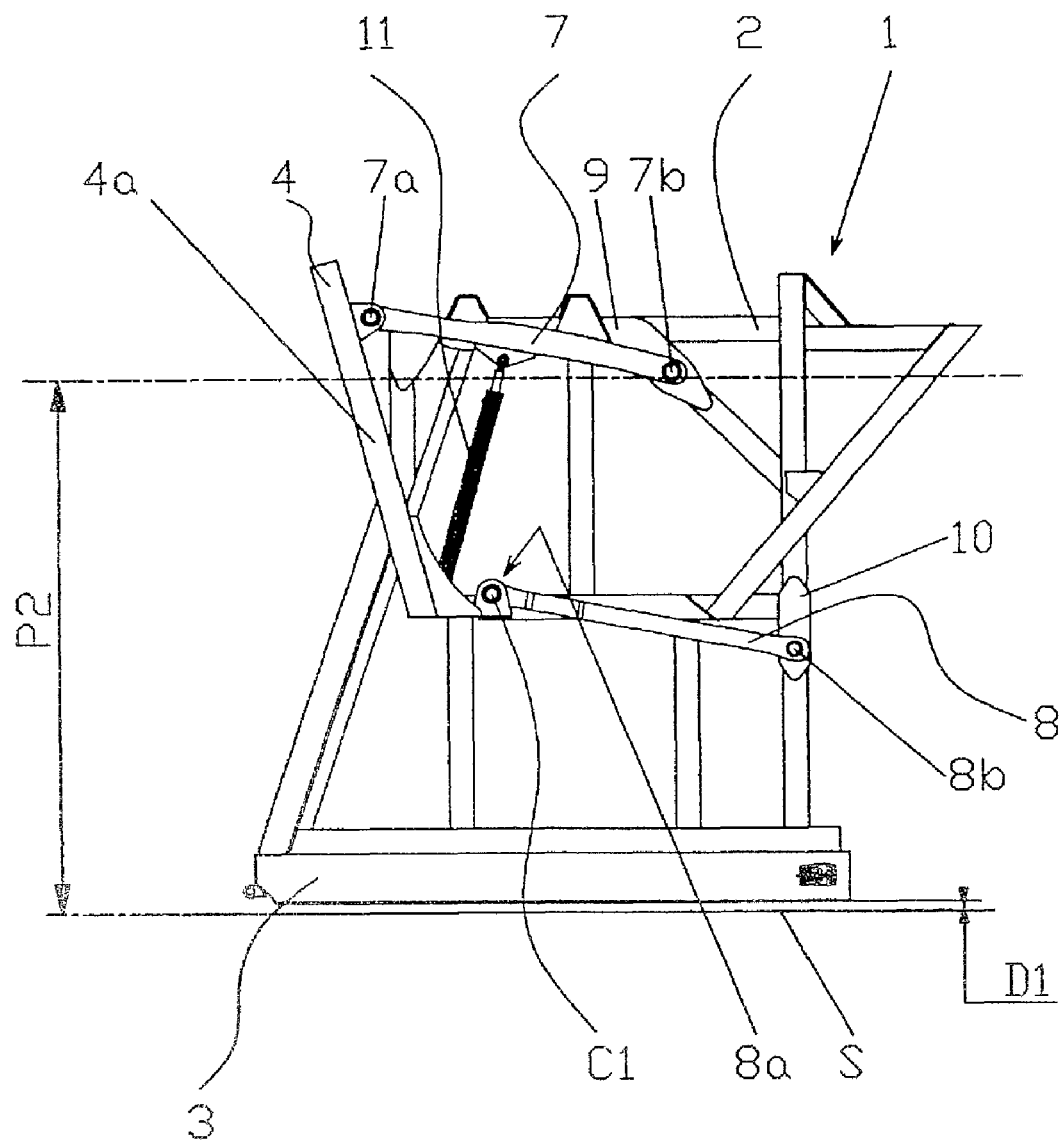
FIG. 1 is a side view of a harvesting head in accordance with the invention.

Reference is made to said drawings to describe an interesting but in no way limiting example of the head and of the harvesting machine according to the invention.

DETAILED DESCRIPTION OF THE INVENTION

The harvesting head 1 according to the invention comprises, similar to grape-picking machines, a chassis 2 in the form of a straddling carrier supporting, on the one hand, a shaking system (not shown) including two fruit-detaching assemblies, mounted opposite to each other and separated by a vertical space, and on the other hand, two transporting systems 3 to receive and transport the picked fruit to a receiving device (bin or other).

The lower horizontal portions of these two transporting systems also ensure tightness below the shaking assemblies.

Preferably this harvesting head is designed to accept the greatest number of picking arms (28 pairs on a height of 3.40 m) in order to harvest the entire height of the trellis while remaining within the clearance limits of 2.50 m wide and 3.60 m high.

The harvesting head 1 is supported by a mounting frame 4 intended to be solidly fastened, preferably in a detachable manner, to the rear of a self-propelled straddling vehicle 5 usually called a self-propelled straddling carrier. For example, through the intermediary of the three-point bearing system the latter is equipped with. More precisely, the harvesting head 1 is intended to be fastened on a self-propelled straddling vehicle 5 comprising a height-adjustable chassis 6, in a manner known in the art.

According to the invention, the position of the harvesting head 1 is height-adjustable in relation to the mounting frame 4. Under these conditions, when the mounting frame 4 of the harvesting head 1 is solidly fastened to the chassis 6 of the self-propelled straddling vehicle 5, it [i.e. the head] is likewise mounted in a height-adjustable manner relative to said self-propelled straddling vehicle.

According to another characteristic arrangement, the mounting frame 4 is connected to the bearing chassis 2 of the harvesting head by means of lateral expanding parallelograms.

Each lateral expanding parallelogram includes: one of the sides 4a of the mounting frame 4, an upper connecting rod 7 and a lower connecting rod 8 which are linked, through the intermediary of one of their ends and by means of hinges 7a, 8a, in the high part and in the low part of said side 4a, respectively. On the other hand, the opposite ends of said connecting rods are linked, by means of hinges 7b, 8b respectively, to lateral fixed elements 9, 10 of the chassis 2.

Means of actuation permit the deformation or displacement of the expanded parallelograms ensuring the vertical movements of the harvesting head 1 in relation to mounting frame 4 of said harvesting head, i.e., relative to the self-propelled straddling vehicle 5, when this head is installed at the rear of said self-propelled straddling vehicle.

These means are, for instance, constituted by a jack 11 connecting, through the intermediary of its opposite ends and by means of hinges, the upper connecting rod 7 and the low part of side 4a corresponding to the mounting frame 4. It is clear that the extension of the jacks 11 results in the upward pivoting of the connecting rods 7, whereas the retraction or shortening of said jacks results in the downward pivoting of said connecting rods.

Figure 3:
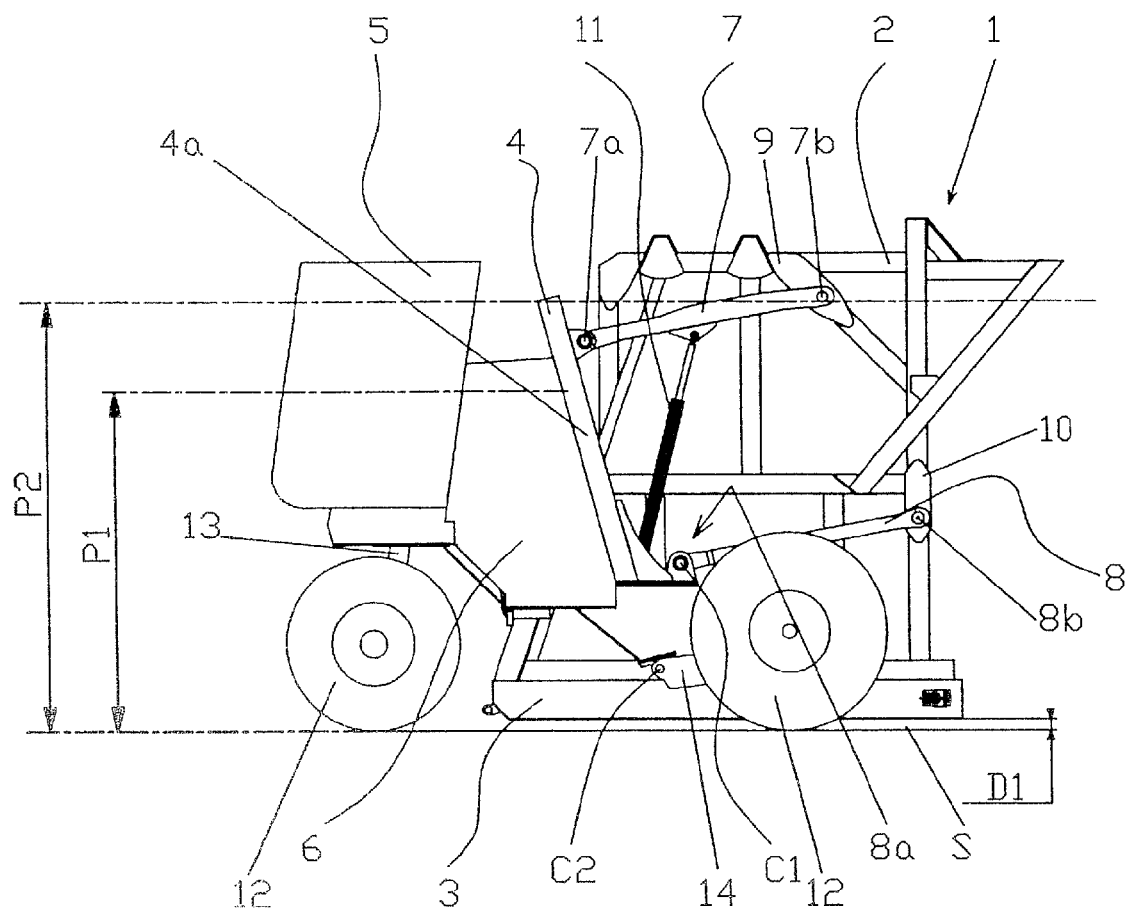
FIG. 3 is a side view of a harvesting assembly consisting of the harvesting head shown in FIG. 1, mounted on the self-propelled straddling vehicle shown in FIG. 2. This assembly is shown in the position suitable for driving on the road.
Figure 4:
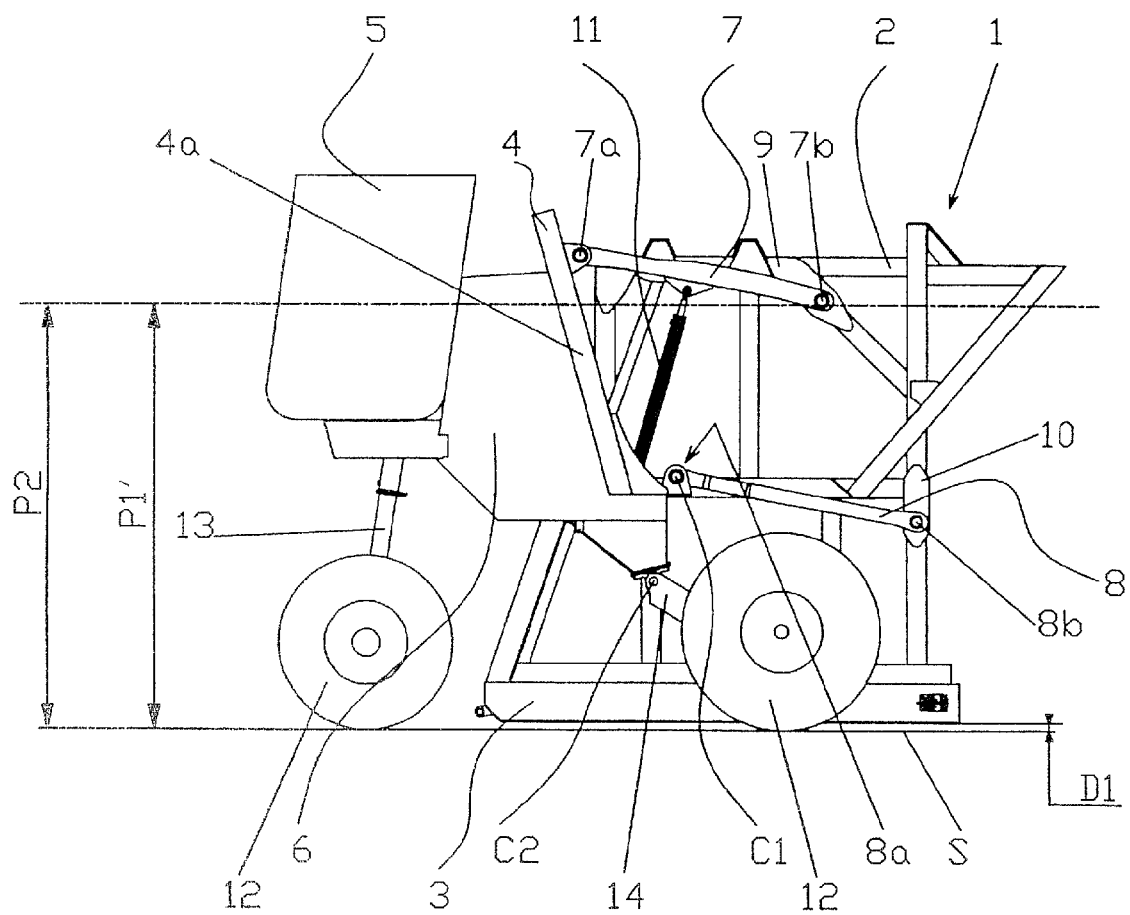
FIG. 4 is a side view analog to FIG. 3, showing said assembly in a harvesting position.

FIGS. 3 and 4 show a harvesting machine according to the invention constituted by a self-propelled straddling vehicle 5 on the chassis 6 and to the rear of which is mounted a harvesting head featuring the previously described characteristic arrangements.

Figure 2:
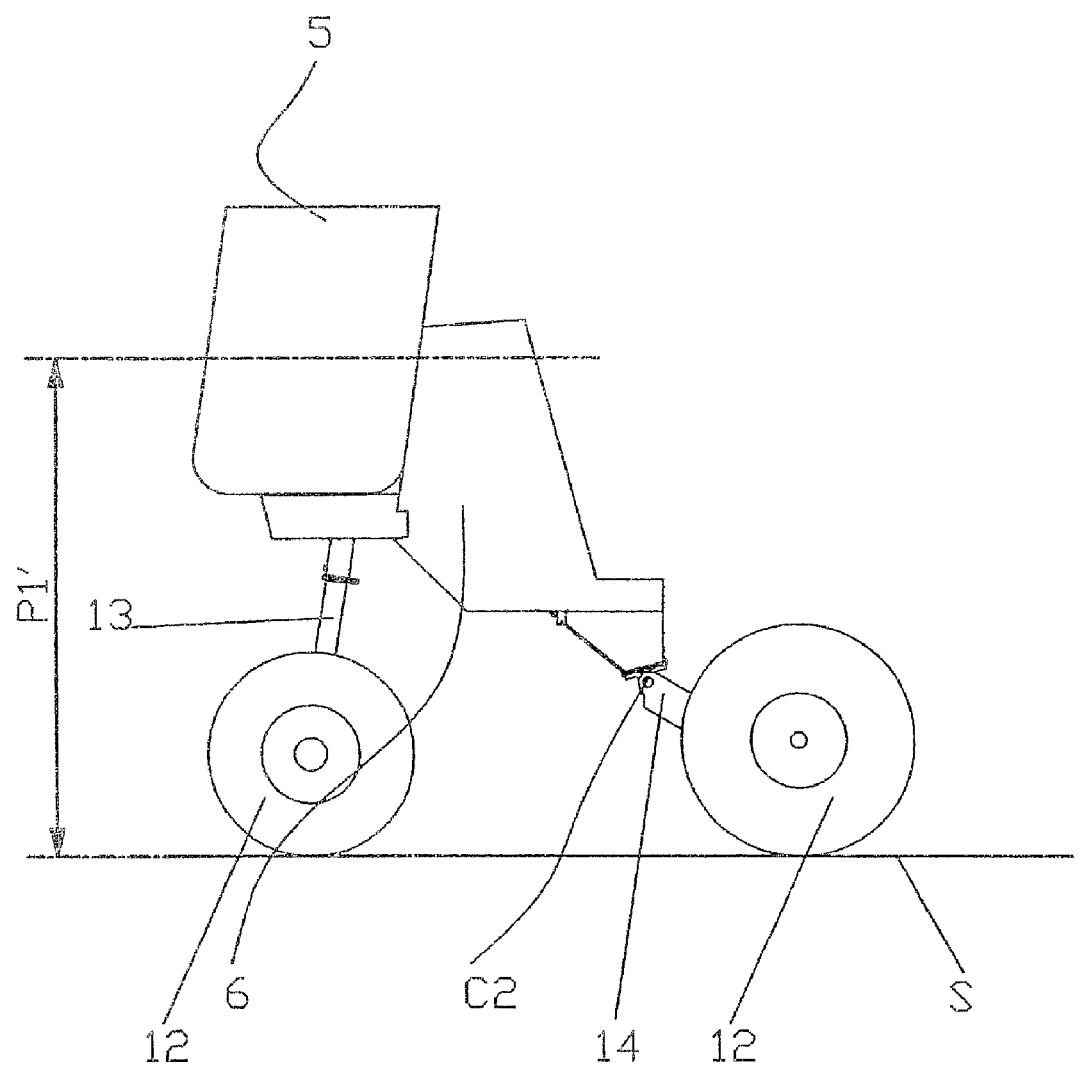
FIG. 2 is a schematic side view of a standard multi-purpose self-propelled straddling vehicle on which this harvesting head can be mounted. This self-propelled straddling vehicle is shown in the high position.

The self-propelled straddling vehicle 5 (FIG. 2) may consist of a standard multi-purpose self-propelled straddling carrier of a type commonly used in viticulture and equipped, as known in the art, with means permitting the height-adjustment of its chassis 6 relative to its supporting wheels 12, that is to say, in relation to the ground S on which these wheels are meant to roll.

According to an advantageous arrangement, the self-propelled straddling vehicle 5 and the harvesting head 1 are laid out so that the clearance height P1 under the arch of the self-propelled straddling vehicle is clearly inferior, when the latter is in its low or road-capable position, to the clearance height P2 of the harvesting head 1, whereas the clearance height under the arch P1' of the self-propelled straddling vehicle 5 may be perceptibly equal or inferior to the clearance height under the arch P2 of said harvesting head 1, in the high position of said self-propelled straddling vehicle, corresponding to the working position of the machine.

At least one of the hinge pins of at least one of the connecting rods 7 and/or 8, preferably the hinge pin 8a of the lower connecting rods 8 is provided with an angle transmitter C1. On the other hand, the suspension system of the telescoping front legs 13 and/or of the rear wheel arms 14) of the self-propelled straddling vehicle 5, preferably the wheel arms 14, is also equipped with angular transmitters C2. These transmitters C1 and C2 are connected to a computer or analog system, so as to ensure the control of the harvesting head 1 and of the self-propelled straddling vehicle 5, so as to keep said harvesting head, and in particular its lower part at a programmed distance 01 relative to the ground S. This distance 01 remains the same, regardless of whether the self-propelled straddling vehicle is in its low or road-capable position, or whether it is in its high position or in the position which corresponds to the working height of the machine.

On FIG. 3 one notices that in the road-capable position the straddling vehicle 5 is lowered to the maximum in order to lower the center of gravity and to ensure good stability, whereas the harvesting head 1 is raised to the maximum, relative to said straddling vehicle which results in a perfectly standard machine with regard to its space requirements (2.50 m wide×3.60 m high) not needing any exceptional transportation. On the other hand, clearance under the arch P1 is, for example, 2.2 m for the straddling vehicle, whereas the clearance under the arch of P2 is 3.4 m for example for the harvesting head 1.

On FIG. 4, one sees that in the working position the straddling vehicle 5 is placed in the maximum raised position, owing to its adjustable suspension system, and the harvesting head 1 is lowered to the maximum, relative to the straddling vehicle which results in a clearance height under the arch P1' of 2.80 m for the straddling vehicle and a clearance height under the arch P2 of 3.40 m for the harvesting head 1 equipped with picking arms.

We claim:

1. An apparatus for harvesting fruit-bearing hedges, the apparatus comprising:
    a self-propelled straddling vehicle having a chassis, said chassis of said self-propelled straddling vehicle having a straddling frame of an arch shape, said straddling frame being height-adjustable between a low position and a high position; and
    a harvesting head having a chassis of a scaffold carrier shape, said chassis of said harvesting head supporting a shaking system having at least a pair of fruit-detaching assemblies mounted opposite to each other and separated by vertical space, said harvesting head having a pair of receiving and transport systems suitable for receiving and transporting picked fruit, said pair of receiving and transport systems having lower horizontal portions forming lower portion of said harvesting head below said shaking system, said harvesting head having a mounting frame removably rigidly attached to a rear of said self-propelled straddling vehicle, said harvesting head connected to said mounting frame by a cooperative structure so as to cause a height adjustment of said harvesting head relative to said mounting frame such that said lower portion of said harvesting head is in a fixed position relative to the earth when said straddling frame of said self-propelled straddling vehicle is in either said high position or said low position, said mounting frame linked to said chassis of said harvesting head through said cooperative structure, said cooperative structure movable independently of the movement of said chassis of said self-propelled straddling vehicle between said high position and said low position.

2. The apparatus of claim 1, said cooperative structure comprising lateral expanding parallelograms.

3. The apparatus of claim 2, said cooperative structure comprising one side of said mounting frame and an upper connecting rod and a lower connecting rod, said upper connecting rod connected by a first hinge at one end thereof to an upper portion of said one side of said mounting frame, said lower connecting rod connected by a second hinge to a lower portion of said one side of said mounting frame, said chassis of said harvesting head having a first lateral element and a second lateral element, said upper connecting rod connected by a third hinge at an opposite end thereof to said first lateral element, said lower connecting rod connected by a fourth hinge at an opposite end thereof to said second lateral element.

4. The apparatus of claim 3, said cooperative structure further comprising a jack having one end hingedly connected to said upper connecting rod and an opposite end hingedly connected to said lower portion of said one side of said mounting frame.

5. The apparatus of claim 1, said arch shape of said straddling frame defining a first clearance height, said harvesting head having an arch defining a second clearance height, said first clearance height being less than said second clearance height when said self-propelled straddling vehicle is in said low position, said first clearance height being equal to or less than said second clearance height when said self-propelled straddling vehicle is in said high position.

6. The apparatus of claim 3, at least one of said first hinge and said second hinge having an angle transmitter so as to control a position of said harvesting head in relation to said self-propelled straddling vehicle so as to maintain said harvesting head a fixed desired distance relative to the earth regardless of whether said self-propelled straddling vehicle is in said high position or said low position.

7. The apparatus of claim 6, said second hinge having said angle transmitter thereon, said self-propelled straddling vehicle having a wheel arm extending therefrom, said wheel arm having another transmitter thereon.

* * * * *